(12) United States Patent
Yamamoto

(10) Patent No.: US 11,502,625 B2
(45) Date of Patent: Nov. 15, 2022

(54) VIBRATION WAVE MOTOR, AND DRIVING APPARATUS HAVING THE SAME

(71) Applicant: CANON KABUSHIKI KAISHA, Tokyo (JP)

(72) Inventor: Yasufumi Yamamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 88 days.

(21) Appl. No.: 17/210,283

(22) Filed: Mar. 23, 2021

(65) Prior Publication Data

US 2021/0305913 A1    Sep. 30, 2021

(30) Foreign Application Priority Data

Mar. 26, 2020  (JP) .............................. JP2020-056027

(51) Int. Cl.
*H02N 2/08* (2006.01)
*H02N 2/00* (2006.01)
*H02N 2/02* (2006.01)

(52) U.S. Cl.
CPC ............... *H02N 2/08* (2013.01); *H02N 2/001* (2013.01); *H02N 2/0055* (2013.01); *H02N 2/026* (2013.01)

(58) Field of Classification Search
CPC ........ H02N 2/08; H02N 2/001; H02N 2/0055; H02N 2/026; H02N 2/006; G02B 7/08
See application file for complete search history.

(56) References Cited

U.S. PATENT DOCUMENTS 10,581,346 B2 *    3/2020   Yamamoto ........... H02N 2/0015

FOREIGN PATENT DOCUMENTS

JP            6567020 B2     8/2019

* cited by examiner

*Primary Examiner* — Emily P Pham
(74) *Attorney, Agent, or Firm* — Cowan, Liebowitz & Latman, P.C.

(57) ABSTRACT

A vibration wave motor includes a vibrator including a piezoelectric element and a vibratory plate, a friction member configured to make a frictional contact with the vibrator, a pressurizer configured to press the vibrator and the friction member against each other, and a guide unit configured to guide a relative movement between the vibrator and the friction member. The guide unit includes a plurality of rollers configured to move relative to the pressurizer, and a guide member that includes a guide portion, the guide portion being configured to extend along a relative movement direction between the vibrator and the friction member and to guide the plurality of rollers. The guide member includes a reinforcer configured to extend along the relative movement direction near a roller closest to a center position of a pressing force by the pressurizer.

7 Claims, 6 Drawing Sheets

A - A

VIBRATION WAVE MOTOR, AND DRIVING APPARATUS HAVING THE SAME

BACKGROUND OF THE INVENTION

Field of the Invention

The present invention relates to a vibration wave motor, and a driving apparatus having the same.

Description of the Related Art

Conventional vibration wave motors compressively energize a vibrator that serves as a driving source against a friction member, and extract a driving force using a frictional force generated by the compressive energization. The extracted driving force is guided in a desired guide direction by a guide unit, and a vibrator and the friction member are driven relative to each other in the guide direction. The guide unit includes a roller and the like so as not to generate an unnecessary load due to the pressing force other than the contact friction between the vibrator and the friction member. The guide unit has a guide member having a guide portion extending in the guide direction. In order to increase the driving amount, it is necessary to increase an extending amount of the guide portion in the guide direction and to increase the size of the guide unit.

Japanese Patent No. ("JP") 6567020 discloses a driving apparatus that reduces a distance between the guide portions while maintaining a positional relationship in which the center of the pressing force does not shift from a position between the rollers in order to restrain the guide unit from becoming larger.

However, in the driving apparatus disclosed in JP 6567020, the extending amount of the guide member in the guide direction increases, a bending moment applied to a component due to the pressing force increases, and the deflection of the component also increases.

In addition, when the distance becomes shorter between the guiding structures, a specific roller can roll to a position close to the pressing center, and the reaction force against the roller is concentrated at that position. Thereby, the force received by the guide member at the contact position with the roller becomes stronger, and the deflection of the guide member also increases. On the other hand, it is undesirable that the unit becomes larger due to the reinforcing structure for suppressing the deflection of the guide member.

SUMMARY OF THE INVENTION

The present invention provides a compact and rigid (or rigidity securing) vibration wave motor having a large driving amount, and a driving apparatus having the same.

A vibration wave motor according to one aspect of the present invention includes a vibrator including a piezoelectric element and a vibratory plate, a friction member configured to make a frictional contact with the vibrator, a pressurizer configured to press the vibrator and the friction member against each other, and a guide unit configured to guide a relative movement between the vibrator and the friction member. The guide unit includes a plurality of rollers configured to move relative to the pressurizer, and a guide member that includes a guide portion, the guide portion being configured to extend along a relative movement direction between the vibrator and the friction member and to guide the plurality of rollers. The guide member includes a reinforcer configured to extend along the relative movement direction near a roller closest to a center position of a pressing force by the pressurizer.

A driving apparatus having the above vibration wave motor also constitutes another aspect of the present invention.

Further features of the present invention will become apparent from the following description of exemplary embodiments with reference to the attached drawings.

DESCRIPTION OF THE EMBODIMENTS

Figure 1:
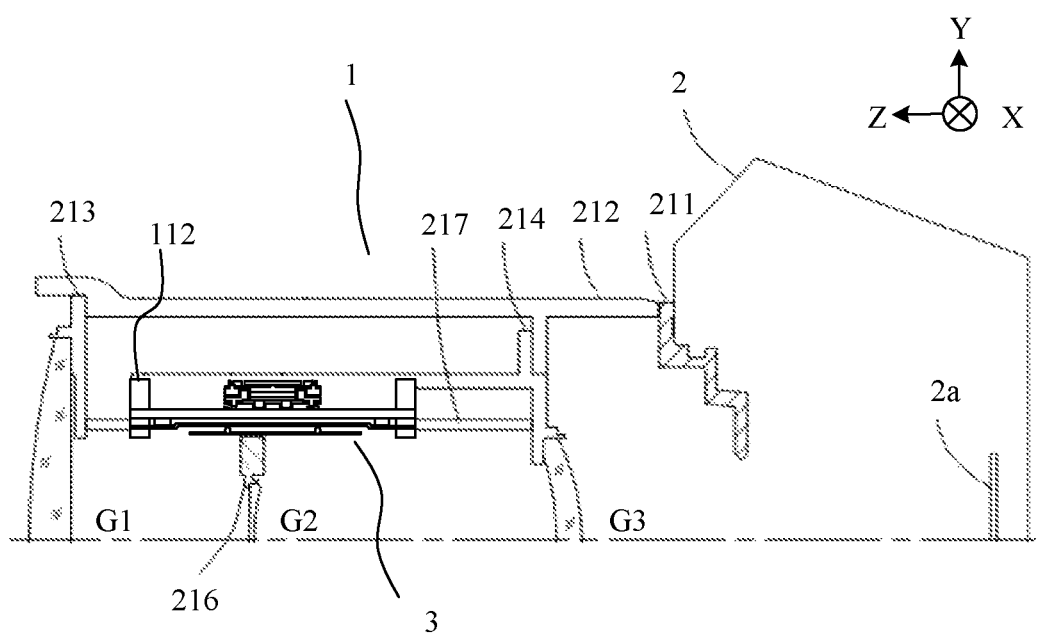
FIG. 1 is a structural diagram of an image pickup apparatus mounted with a vibration wave motor according to a first embodiment.

Referring now to the accompanying drawings, a detailed description will be given of embodiments according to the present invention. Corresponding elements in respective figures will be designated by the same reference numerals, and a duplicate description thereof will be omitted.

First Embodiment

FIG. 1 is a structural diagram of an image pickup apparatus including a lens barrel (driving apparatus) 1 which is an illustrative driving apparatus mounted with a vibration wave motor 3 according to this embodiment. Since the lens barrel 1 has a substantially rotationally symmetric shape, FIG. 1 illustrates only an upper half of the lens barrel 1.

Although the lens barrel 1 is detachably attached to the camera body 2 in this embodiment, the lens barrel 1 may be integrated with the camera body 2.

An image sensor 2a is provided in the camera body 2. A mount 211 of the camera body 2 has a bayonet unit configured to attach the lens barrel 1 to the camera body 2.

The lens barrel 1 has a fixed cylinder 212 that contacts a flange unit of the mount 211. The fixed cylinder 212 and the mount 211 are fixed by screws (not shown). A front lens barrel 213 that holds a lens G1 and a rear lens barrel 214 that holds a lens G3 are fixed to the fixed cylinder 212.

The lens barrel 1 has a focus lens holding frame 216 for holding a lens G2. The focus lens holding frame 216 is held linearly movably by a guide bar 217 held by the front lens barrel 213 and the rear lens barrel 214. The focus lens holding frame 216 and the lens G2 move together as the vibration wave motor 3 is driven. In other words, the focus lens holding frame 216 and the lens G2 are driven members driven by the vibration wave motor 3.

Figure 2C:
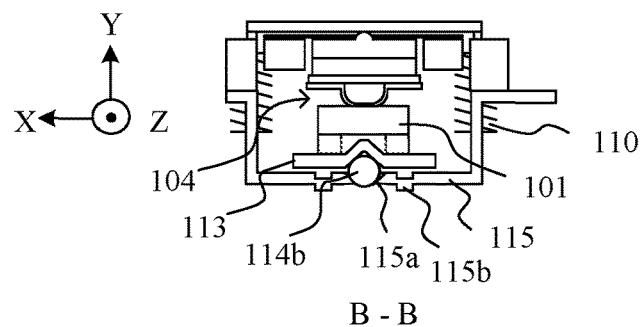
FIGS. 2A to 2C are structural diagrams of the vibration wave motor according to the first embodiment.
Figures 2A, 2B:
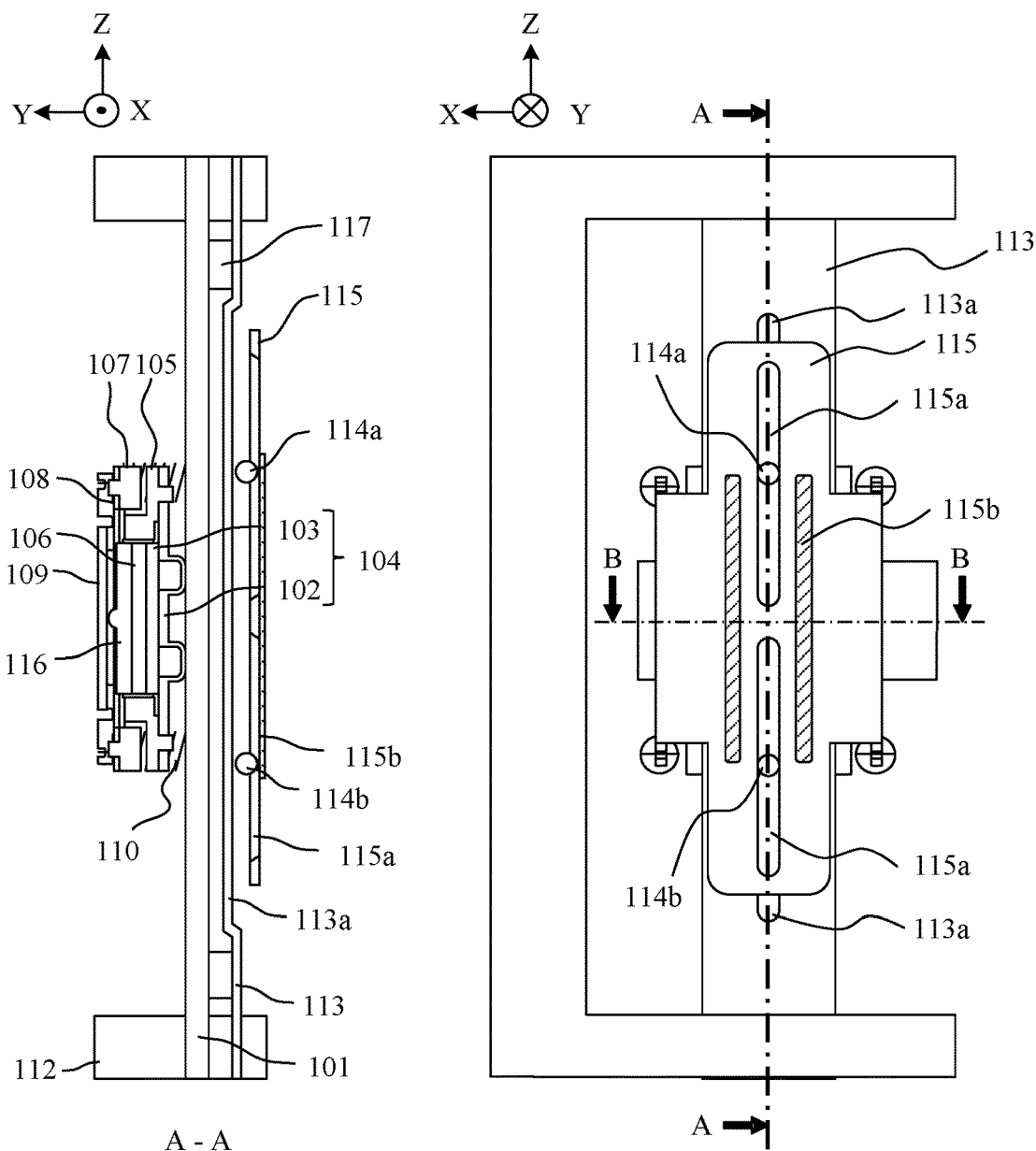

FIGS. 2A to 2C are structural diagrams of the vibration wave motor 3 according to this embodiment. FIG. 2A illustrates the vibration wave motor 3 viewed from a Y-axis direction. FIG. 2B is a sectional view of the vibration wave motor 3 taken along a line A-A in FIG. 2A. FIG. 2C is a sectional view of the vibration wave motor 3 taken along a line B-B in FIG. 2A.

The vibrator 104 includes an elastic vibratory plate 102 and a piezoelectric element 103. The vibratory plate 102 and the piezoelectric element 103 are fixed to each other by an adhesive agent or the like. An unillustrated flexible printed circuit (board) for supplying power is fixed to the piezoelectric element 103. When a voltage is applied to the piezoelectric element 103, an ultrasonic vibration is excited.

The vibrator 104 and a vibrator holder 105 are fixed by an adhesive agent or the like. The method of fixing the vibrator 104 and the vibrator holder 105 is not limited to the method of this embodiment. A movable frame member 107 is connected to the vibrator holder 105 via a thin sheet metal 108. The friction member 101 and a fixed-side guide member 113 are fixed to a fixed frame member 112 by screws or the like. An unillustrated flange unit is formed on the fixed frame member 112, and is fixed to the rear lens barrel 214 with screws or the like.

Springs (pressurizer) 110 connect a pressurizing plate 109 and the movable-side guide member (guide member) 115 at four locations, and apply a pressing three that. makes the vibrator 104 into a frictional contact with the friction member 101. The pressurizing plate 109 contacts an elastic member attaching member 116, and transmits the pressing force. An elastic member 106 is disposed between the elastic member attaching member 116 and the piezoelectric element 103. The elastic member attaching member 116 and the elastic member 106 prevent a direct contact between the pressurizing plate 109 and the piezoelectric element 103 in order to prevent the piezoelectric element 103 from getting damaged.

The movable frame member 107 and the movable-side guide member 115 are fixed with screws or the like (not shown). The method of fixing the movable frame member 107 and the movable-side guide member 115 is not limited to the method of this embodiment. The movable-side guide member 115 includes two movable-side guide portions 115a with V-grooves formed along a Z-axis direction, and a reinforcer 115b that extends in the Z-axis direction. The fixed-side guide member 113 includes a fixed-side guide portion 113a with a V groove. (Rolling) balls (rollers) 114a and 114b are sandwiched between the fixed-side guide portion 115a and the fixed-side guide portion 113a. The fixed-side guide member 113, the balls 114a and 114b, and the movable-side guide member 115 constitute a guide unit configured to guide the vibrator 104 in the relative movement direction (Z-axis direction in this embodiment).

A damper 117 is sandwiched between the friction member 101 and the fixed-side guide member 113. The damper 117 is elastic and generates an energizing (or biasing or urging) force due to an elastic reaction force against the friction member 101 and the fixed-side guide member 113. Thereby, it is possible to reduce deflections of the friction member 101 and the fixed-side guide member 113 and unnecessary vibrations of the friction member 101.

The vibratory plate 102 includes a contact portion that contacts the friction member 101 in a compressive energization state by the pressing force of the spring 110. As described above, when a voltage is applied to the piezoelectric element 103, the ultrasonic vibration is excited and a resonance phenomenon occurs in the vibrator 104. At this time, two types of standing waves are generated in the vibrator 104, and a substantially elliptical motion is generated in the contact portion of the vibratory plate 102. When the vibratory plate 102 is in pressure contact with the friction member 101, the elliptical motion generated in the vibratory plate 102 is efficiently transmitted to the friction member 101. As a result, the structure connected to the vibrator 104 moves in the Z-axis direction relative to the fixed member that includes the friction member 101, the fixed frame member 112, and the fixed-side guide member 113. The focus lens holding frame 216 connected to the movable-side guide member 115 and the lens G2 are also integrally moved in the Z-axis direction. The relative movement distance corresponds to the driving distance of the vibration wave motor 3.

A description will now be given of a reconciliation of the miniaturization and ensuring rigidity of the vibration wave motor 3 having a large driving amount by the reinforcer 115b.

In this embodiment, the movable-side guide member 115 extends long in the Z-axis direction in order to increase the driving distance of the vibration wave motor 3. The fixed-side guide portion 115a is formed of a hole-shaped V-groove for the miniaturization of the vibration wave motor 3 in the Z-axis direction. Therefore, the hole shape also extends long in the Z-axis direction. In this structure, the rigidity of the movable-side guide member 115 as a single member tends to decrease.

In order to restrain the movable-side guide member 115 from extending in the Z-axis direction, the distance between the two movable-side guide portions 115a in the Z-axis direction is made short in a range in which the balls 114a and 114b sandwich the center position of the pressing forces by the springs 110 (pressing center). Therefore, one of the balls can move to almost the pressing center, and the pressing reaction force is concentrated at that position.

This embodiment provides the movable-side guide member 115 with the reinforcer 115b in order to restrain the movable-side guide member 115 from deforming due to the above structure.

Figures 3A, 3B, 3C:
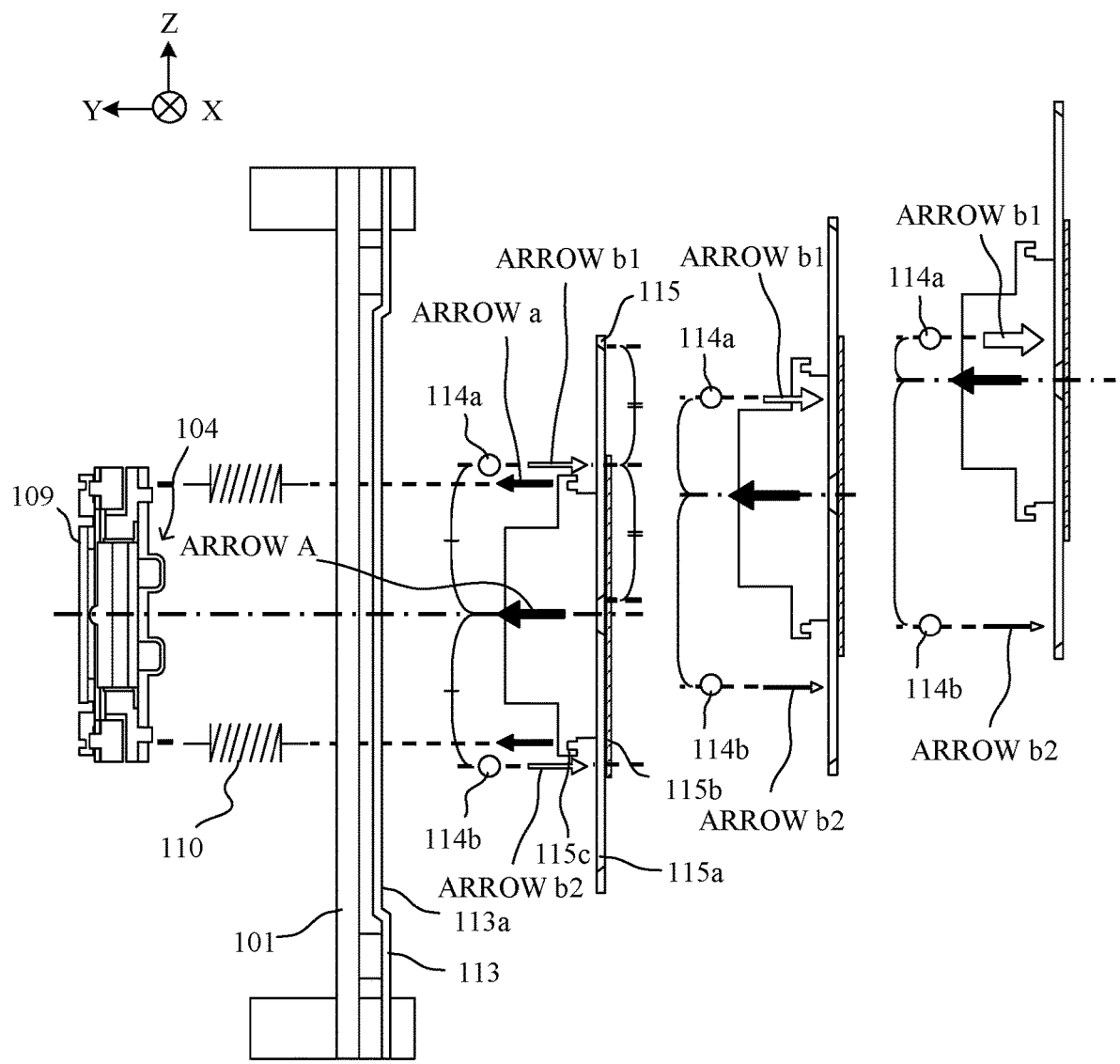
FIGS. 3A to 3C explain a positional relationship of a reinforcer.

Referring now to FIGS. 3A to 3C, a description will be given of a positional relationship of the reinforcer 115b. FIGS. 3A to 3C are developed views of the vibration wave motor 3 in a section taken along a line A-A in FIG. 2A. FIG. 3A illustrates the vibrator 104 located at the center position of the relative movement of the vibration wave motor 3. FIG. 3B illustrates the vibrator 104 that has relatively moved in the Z-axis direction from the state of FIG. 3A. FIG. 3C illustrates the vibrator 104 that has relatively moved in the Z-axis direction from the state of FIG. 3B and reached the moving end of the relative movement.

As described above, the four springs 110 connect the pressurizing plate 109 and the movable-side guide member 115 to each other. The pressing force applied to the pressurizing plate 109 acts on the vibrator 104 so as to make a pressure contact with the friction member 101. The pressing force applied to the movable-side guide member 115 urges the movable-side guide member 115 against the fixed-side guide member 113 so as to sandwich the balls 114a and 114b. The movable-side guide member 115 receives the pressing force from the springs 110 and the reaction forces from the balls 114a and 114b.

The pressing force applied to the movable-side guide member 115 is indicated by four arrows "a" applied at a connector (transmitter) 115c provided on the movable-side guide member 115 connected to the spring 110. The four pressing forces are indicated by arrows "A" as the resultant force at the pressing center.

Reaction forces indicated by arrows b1 and b2 given to the movable-side guide member 115 by the balls 114a and 114b are determined according to the distance from the pressing center. In FIG. 3A, the balls 114a and 114b are located at equal distances from the pressing center. At this time, the reaction forces applied from the balls 114a and 114b are equal to each other. The balls 114a and 114b are located at the center of the fixed-side guide portion 115a in the relative movement direction. In FIG. 3B, the distance of the ball 114a from the pressing center is shorter than the distance of the ball 114b from the pressing center. At this time, the reaction force applied from the ball 114a is larger than the reaction force applied from the ball 114b. In FIG. 3C, a ratio of the distance of the ball 114b from the pressing center to the distance of the ball 114a from the pressing center is larger than a ratio in FIG. 3B.

While FIGS. 3A to 3C illustrate the vibrator 104 that has relatively moved in the Z-axis positive direction, a relatively large reaction force is applied from the ball closer to the pressing center where the vibrator 104 relatively moves in the Z-axis negative direction.

As described above, the reaction force of the balls closer to the pressing center is larger from the positions of the balls 114a and 114b in FIG. 3A. In this embodiment, the reinforcer 115b is located at a position near the fixed-side guide portion 115a where the ball closest to the pressing center in the relative movement direction is located among the plurality of balls, in order to reinforce the rigidity against the ball having a large reaction force. More specifically, the reinforcer 115b is provided so as to overlap the ball closest to the pressing center in the relative movement direction.

Figures 4A, 4B:
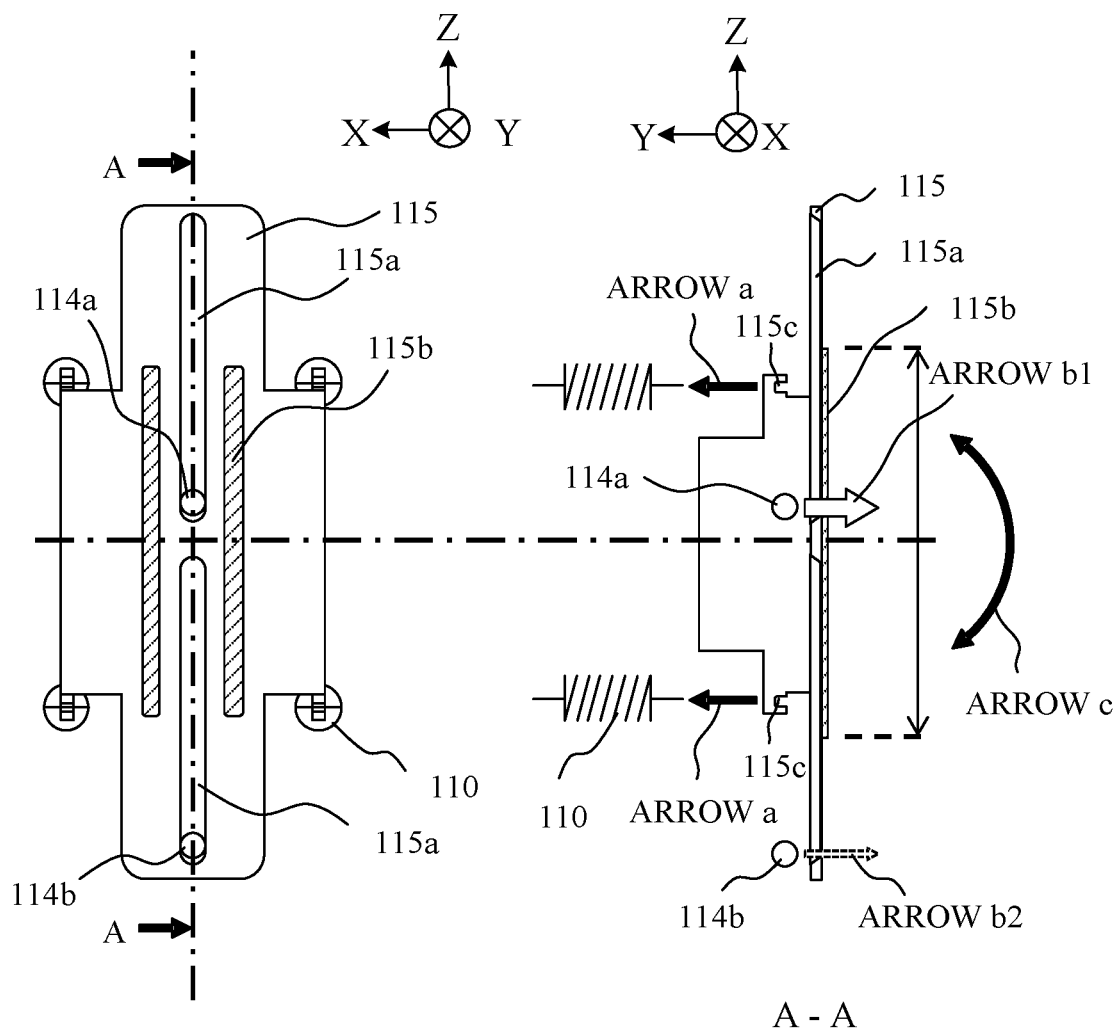
FIGS. 4A and 4B illustrate the rigidity reinforced by the reinforcer.

Referring now to FIGS. 4A and 4B, a description will be given of the rigidity reinforced by the reinforcer 115b. FIGS. 4A and 4B illustrate the rigidity reinforced by the reinforcer 115b. FIGS. 4A and 4B illustrate the movable-side guide member 115, the springs 110 that apply the pressing forces to the movable-side guide member 115, and the balls 114a and 114b. FIGS. 4A and 4B illustrate the vibrator 104 that has reached the moving end of the relative movement.

FIG. 4A is a diagram viewed from the Y-axis direction. FIG. 4B illustrates a developed view of FIG. 4A in a section taken along the line A-A.

Referring now to FIG. 4B, a description be given of the force applied to the movable-side guide member 115 and the generated moment. The movable-side guide member 115 receives the pressing force indicated by the arrow "a" at the connector 115c connected to the spring 110. The reaction forces indicated by the arrows b1 and b2 are applied to the movable-side guide member 115 from the balls 114a and 114b. As described above, the reaction force applied from each ball differs depending on the position. In FIGS. 4A and 4B, since the ball 114a is closer to the pressing center, the reaction force applied from the ball 114a becomes larger. Thereby, the moment indicated by an arrow c is generated on the movable-side guide member 115 where the contact point with the ball 114a serves as the fulcrum and the connector 115c serves as the action point. At this time, due to the decreased rigidity of the movable-side guide member 115 and the concentration of the reaction force on the ball 114a, the movable-side guide member 115 has been likely to deform along the moment indicated by the arrow c.

This embodiment can reinforce the rigidity against the moment indicated by the arrow c using the reinforcer 115b and restrain the movable-side guide member 115 from deforming. Since the reinforcer 115b is disposed so as to overlap the ball having a larger reaction force in the relative movement direction, the rigidity of the range overlapping the fulcrum of the moment can be reinforced regardless of the position of the vibrator 104 during the relative movement. Since the reinforcer 115b is disposed so as to overlap the connector 115c connected to the spring 110 in the relative movement direction, the rigidity of the range overlapping the action point of the moment can be reinforced.

Turning back to FIGS. 2A to 2C, a description will be given of the miniaturization of the vibration wave motor 3.

In FIG. 2C, the movable-side guide member 115 is disposed at a position that controls the unit size with which the components overlap each other longest in the Y-axis direction. Since the reinforcer 115b is formed in a half-cut shape, a structure for reinforcing the rigidity can be disposed within the thickness of the component. The reinforcer 115b is disposed so as to overlap the fixed-side guide portion 115a in the Y-axis direction, which is the pressing direction of the spring 110. With the above structure, the reinforcer 115b does not increase the size of the movable-side guide member 115 in the Y-axis direction, or does not increase the size of the vibration wave motor 3 in the Y-axis direction. In this embodiment, the reinforcer 115b is formed in a half-pulled shape, but it may be formed in any shape as long as it fits within the thickness of the movable-side guide member 115 and does not increase the dimension in the Y-axis direction. For example, it may be configured in a diaphragm shape or a notch shape.

Figure 5A:
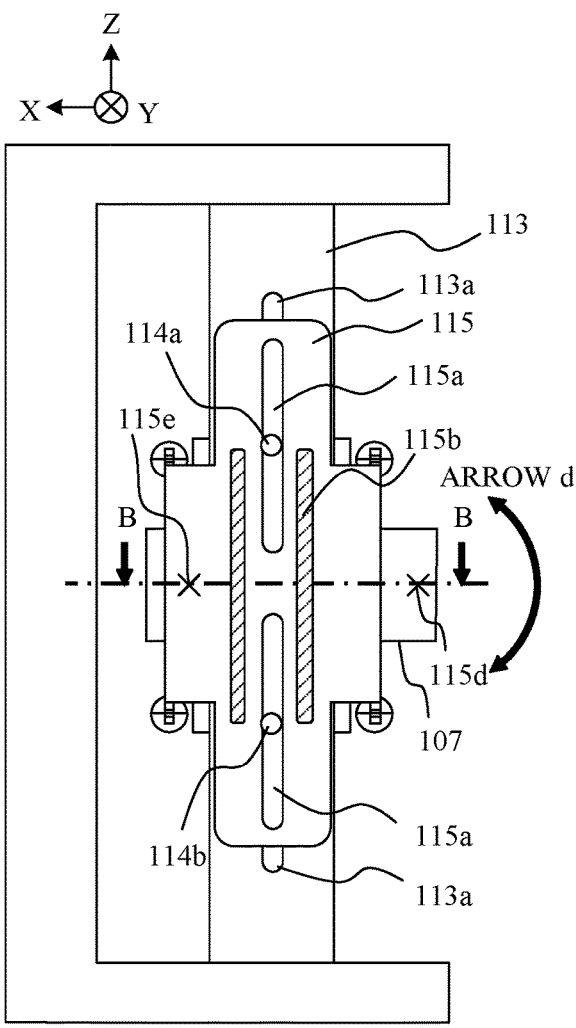
FIGS. 5A and 5B illustrating a positional relationship between the reinforcer and a driven member.
Figure 5B:
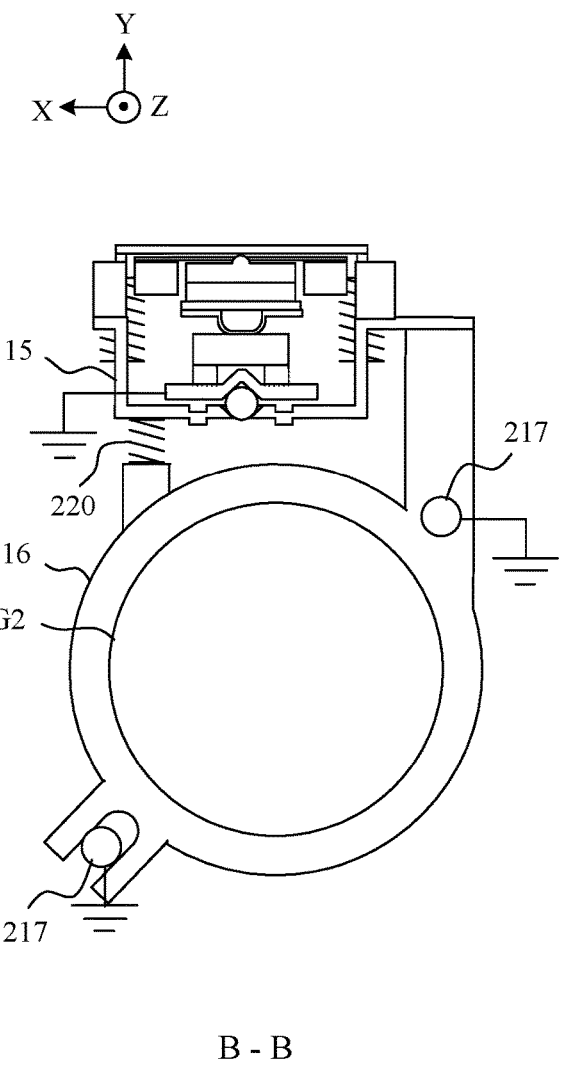

Referring now to FIGS. 5A and 5B, a description will be given of a positional relationship between the reinforcer 115b, the focus lens holding frame 216, and the lens G2, which serve as driven members. FIGS. 5A and 5B explain the positional relationship between the reinforcer 115b and the driven members. FIG. 5A illustrates the vibration wave motor 3 viewed from the Y-axis direction. FIG. 5B is a sectional view of the vibration wave motor 3 taken along the line B-B in FIG. 5A with the driven member.

As described above, the vibrator 104 is guided in the relative movement direction by the guide unit including the fixed-side guide member 113, the balls 114a and 114b, and the movable-side guide member 115. The focus lens holding frame 216 and the lens G2 are guided in the Z-axis direction by the guide bar 217. Here, the vibration wave motor 3 and the focus lens holding frame 216 are connected to each other at the connector 115d provided on the movable-side guide member 115 integrally and steadily (without play) in the Z-axis direction. Thus, as the vibrator 104 moves in the relative movement direction, the focus lens holding frame 216 and the lens G2 also move together.

At this time, the inertial force of the focus lens holding frame 216 and the lens G2 acts on the connector 115d in the Z-axis direction. Due to this inertial force, the moment indicated by an arrow d acts on the contact positions with the balls 114a and 114b as fulcrums. Since the reinforcer 115b is disposed so as to overlap the connector 115d in the relative movement direction, the rigidity against the moment indicated by the arrow d can be reinforced.

The focus lens holding frame 216 has a slight backlash in the direction orthogonal to the Z-axis direction from the guide bar 217. When the orientation of the lens barrel 1 changes, it is undesirable that the optical axis of the lens G2 changes minutely due to this backlash. Therefore, as illustrated in FIG. 5B, the barrel energizing spring (energizer) 220 may be disposed between the focus lens holding frame 216 and the vibrator 104 so as to always bias the backlash in a fixed direction. In this embodiment, the movable-side guide member 115 receives the energizing force from the barrel energizing spring 220 at a transmitter 115e. Thereby, the energizing force of the barrel energizing spring 220 acts on the movable-side guide member 115 in the Y-axis direction. Due to the energizing force of the barrel energizing spring 220, a bending moment is generated with the balls 114a and 114b as fulcrums. Since the reinforcer 115b is disposed so as to overlap the connector 115e in the relative movement direction, the rigidity against the bending moment can be reinforced.

As described above, the structure according to this embodiment can realize a compact and rigid (or rigidity securing) vibration wave motor having a large driving amount.

Second Embodiment

Figure 6C:
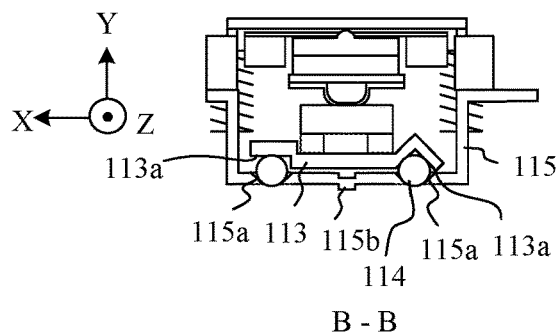
FIGS. 6A to 6C are structural diagrams of a vibration wave motor according to a second embodiment.
Figure 6B:
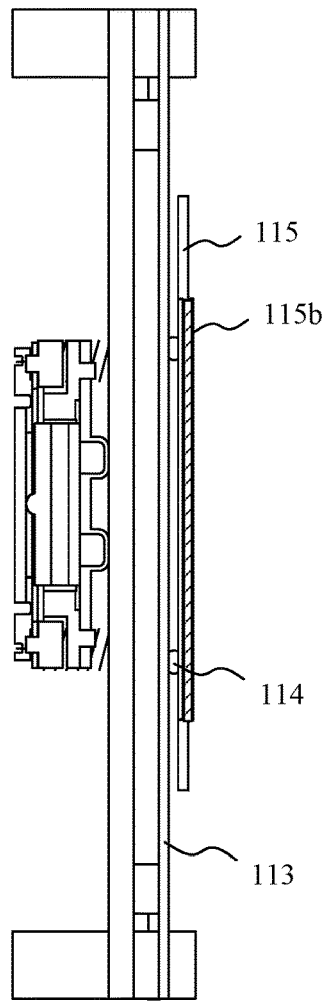
Figure 6A:
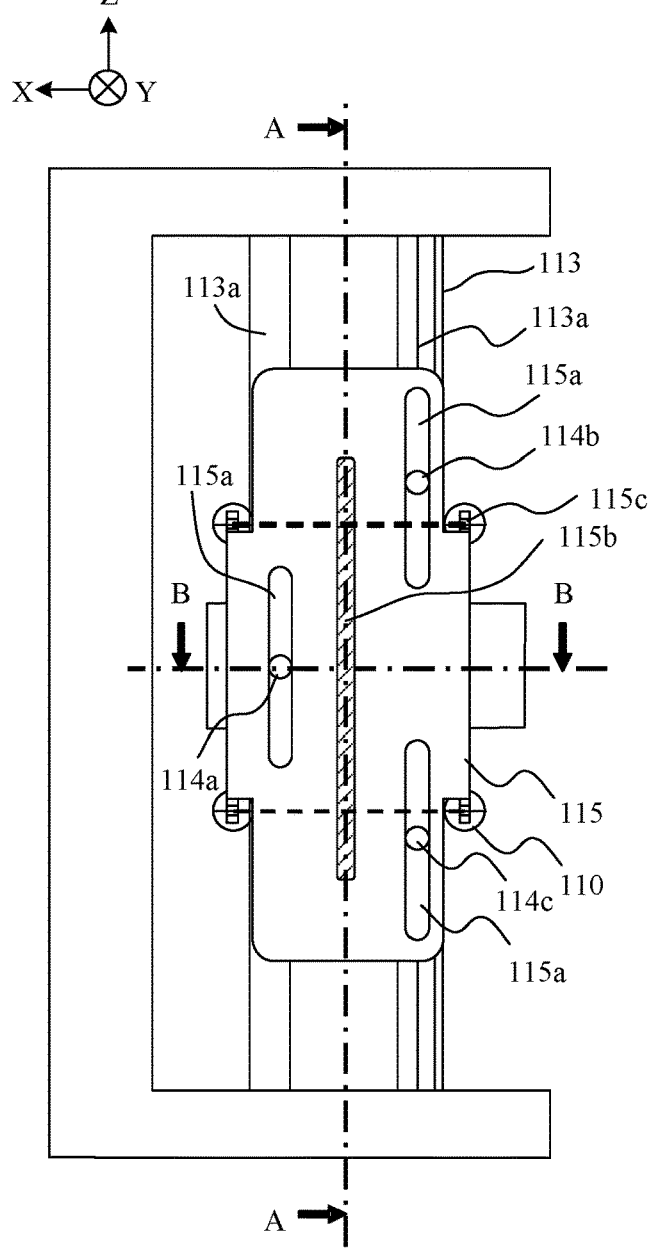

FIGS. 6A to 6C are structural diagrams of a vibration wave motor 3 according to this embodiment. FIG. 6A illustrates the vibration wave motor 3 viewed from the Y-axis direction. FIG. 6B is a sectional view of the vibration wave motor 3 taken along a line A-A in FIG. 6A. FIG. 6C is a sectional view taken along a line B-B in FIG. 6A of the vibration wave motor 3. This embodiment will discuss only the difference from the first embodiment, and a description of the common structure will be omitted.

In this embodiment, the movable-side guide member 115 includes three movable-side guide portions (guide portions) 115a with V-grooves. The fixed-side guide member 113 includes a fixed-side guide portion 113a with one V-groove and one flat surface. The balls (rollers) 114a, 114b, and 114c are sandwiched between the fixed-side guide portion 115a and the fixed-side guide portion 113a. The fixed-side guide member 113, the balls 114a, 114b, and 114c, and the movable-side guide member 115 constitute a guide unit configured to guide the vibrator 104 in the relative movement direction (Z-axis direction in this embodiment).

The first embodiment provides only two balls 114a and 114b, and thus the orientation of the vibrator 104 around the Z axis is determined by the connection with the focus lens holding frame 216. On the other hand, this embodiment provides the three balls 114a, 114b, and 114c, and thus the orientation of the vibrator 104 around the Z axis is determined without a connection with the focus lens holding frame 216.

In this embodiment, the ball 114a is always closest to the pressing center of the pressing forces by the springs 110, and the reaction force from the ball 114a is the largest. Accordingly, in this embodiment, the reinforcer 115b provided on the movable-side guide member 115 is disposed at a position near the fixed-side guide portion 115a where the ball 114a closest to the pressing center is disposed. More specifically, the reinforcer 115b is disposed so as to overlap the ball 114a in the relative movement direction. In this embodiment, the connector 115c connected to the spring 110 provided on the movable-side guide member 115 is disposed farther from the pressing center than the fixed-side guide portion 115a where which the ball 114a is disposed. Therefore, the reinforcer 115b is disposed so as to overlap the connector 115c in the Z-axis direction.

Here, in this embodiment, the pressing center of the pressing forces of the springs 110 and the fixed-side guide portions 115a are disposed at regular intervals in the X-axis direction. At this time, the reaction force from the ball 114a against the pressing force of the spring 110 is always larger than the reaction force from another ball. On the other hand, if the pressing center of the pressing forces of the springs 110 and the fixed-side guide portions 115a are not disposed at regular intervals in the X-axis direction, the ball closest to the pressing center of the pressing forces of the springs 110 may not be the ball 114a. Even in this case, the reinforcer 115b may be disposed at a position near the fixed-side guide portion 115a where the ball having the largest reaction force is disposed so as to overlap the ball having the largest reaction force in the relative movement direction.

As described above, the structure according to this embodiment can realize a compact and rigid (rigidity securing) vibration wave motor having a large driving amount.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-056027, filed on Mar. 26, 2020 which is hereby incorporated by reference herein in its entirety.

What is claimed is:

1. A vibration wave motor comprising:
    a vibrator including a piezoelectric element and a vibratory plate;
    a friction member configured to make a frictional contact with the vibrator;
    a pressurizer configured to press the vibrator and the friction member against each other; and
    a guide unit configured to guide a relative movement between the vibrator and the friction member,
    wherein the guide unit includes a plurality of rollers configured to move relative to the pressurizer, and a guide member that includes a guide portion, the guide portion being configured to extend along a relative movement direction between the vibrator and the friction member and to guide the plurality of rollers, and
    wherein the guide member includes a reinforcer configured to extend along the relative movement direction near a roller closest to a center position of a pressing force by the pressurizer.

2. The vibration wave motor according to claim 1, wherein the reinforcer is provided to overlap the roller closest to the center position of the pressing force by the pressurizer.

3. The vibration wave motor according to claim 1, wherein the reinforcer overlaps the guide portion in a pressing direction of the pressurizer.

4. The vibration wave motor according to claim 1, wherein the guide member includes a transmitter configured to transmit the pressing force from the pressurizer, and
    wherein the reinforcer overlaps the transmitter in the relative movement direction.

5. The vibration wave motor according to claim 1, wherein the guide member includes a connector connected to a driven member configured to move with the relative movement between the vibrator and the friction member, and
    wherein the reinforcer overlaps the connector in the relative movement direction.

6. The vibration wave motor according to claim 1, wherein the guide member includes a transmitter configured to transmit an energizing force in a direction orthogonal to the relative movement direction from an energizer having an end connected to a driven member configured to move with the relative movement between the vibrator and the friction member, and
    wherein the reinforcer overlaps the transmitter in the relative movement direction.

7. A driving apparatus comprising:
    a vibration wave motor; and
    a driven member driven by the vibration wave motor,
    wherein the vibration wave motor includes:
    a vibrator including a piezoelectric element and a vibratory plate;
    a friction member configured to make a frictional contact with the vibrator;
    a pressurizer configured to press the vibrator and the friction member against each other; and a guide unit configured to guide a relative movement between the vibrator and the friction member, wherein the guide unit includes a plurality of rollers configured to move relative to the pressurizer, and a guide member that includes a guide portion, the guide portion being configured to extend along a relative movement direction between the vibrator and the friction member and to guide the plurality of rollers, and wherein the guide member includes a reinforcer configured to extend along the relative movement direction near a roller closest to a center position of a pressing force by the pressurizer.

* * * * *